United States Patent
Lee et al.

(10) Patent No.: US 9,783,672 B2
(45) Date of Patent: *Oct. 10, 2017

(54) POLYCARBONATE RESIN COMPOSITION AND MOLDED PRODUCT FORMED FROM SAME

(71) Applicant: Cheil Industries Inc., Gumi-si (KR)

(72) Inventors: Dong Geun Lee, Uiwang-si (KR); O Sung Kwon, Uiwang-si (KR); Jun Ho Chi, Uiwang-si (KR); Jong Chan Hur, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/652,160

(22) PCT Filed: Apr. 2, 2013

(86) PCT No.: PCT/KR2013/002697
§ 371 (c)(1),
(2) Date: Jun. 15, 2015

(87) PCT Pub. No.: WO2014/104484
PCT Pub. Date: Jul. 3, 2014

(65) Prior Publication Data
US 2015/0299462 A1    Oct. 22, 2015

(30) Foreign Application Priority Data
Dec. 27, 2012   (KR) ................ 10-2012-0155613

(51) Int. Cl.
*C08L 69/00* (2006.01)
*C08L 51/00* (2006.01)

(52) U.S. Cl.
CPC ............. *C08L 69/00* (2013.01); *C08L 51/003* (2013.01); *C08L 2205/03* (2013.01)

(58) Field of Classification Search
CPC ...... C08L 69/00; C08L 51/04; C08L 2205/03; C08L 51/003
See application file for complete search history.

(56) References Cited

U.S. PATENT DOCUMENTS

| 6,331,580 | B1 * | 12/2001 | Molnar ................ C08F 257/02 523/201 |
|---|---|---|---|
| 6,395,364 | B1 | 5/2002 | Davis et al. |
| 7,317,067 | B2 | 1/2008 | Ikeda et al. |
| 7,671,169 | B2 | 3/2010 | Mullen et al. |
| 7,759,456 | B2 | 7/2010 | Brack et al. |
| 8,470,934 | B2 | 6/2013 | Heuer et al. |
| 8,674,053 | B2 | 3/2014 | Isahaya et al. |
| 8,691,902 | B2 | 4/2014 | Grcev et al. |
| 2006/0036035 | A1 * | 2/2006 | Govaerts et al. ............ 525/101 |
| 2008/0015291 | A1 | 1/2008 | Siripurapu et al. |
| 2010/0159211 | A1 | 6/2010 | Blackburn et al. |
| 2010/0160575 | A1 | 6/2010 | Goossens et al. |
| 2011/0281995 | A1 * | 11/2011 | Ha et al. .................. 524/506 |
| 2012/0052425 | A1 | 3/2012 | Jun et al. |
| 2012/0100474 | A1 | 4/2012 | Hikosaka et al. |
| 2012/0165425 | A1 | 6/2012 | Park et al. |
| 2013/0030094 | A1 | 1/2013 | Uchimura et al. |
| 2014/0171583 | A1 * | 6/2014 | Hur et al. .................. 524/537 |

FOREIGN PATENT DOCUMENTS

| CN | 102093685 A | 6/2011 | |
|---|---|---|---|
| CN | 102822233 A | 12/2012 | |
| EP | 2199076 A1 | 6/2010 | |
| JP | 06248066 A * | 9/1994 | ............ C08G 64/06 |
| JP | 2011-105931 A | 6/2011 | |
| KR | 10-1093371 B1 | 6/1999 | |
| KR | 10-2003-0022340 A | 3/2003 | |
| KR | 10-2004-0102362 A | 12/2004 | |
| KR | 10-2009-0026339 A | 3/2009 | |
| KR | 10-2012-0031179 A | 3/2012 | |
| KR | 10-2012-0073818 A | 7/2012 | |
| KR | 10-2012-098773 A | 9/2012 | |
| WO | 2014/092243 A1 | 6/2014 | |
| WO | 2014/104484 A1 | 7/2014 | |

OTHER PUBLICATIONS

International Search Report in counterpart International Application No. PCT/KR2013/002697 dated Jun. 26, 2013, pp. 1-4.
Office Action in commonly owned Chinese Application No. 2013105461902 dated May 12, 2015, pp. 1-2.
English-translation of Office Action in commonly owned Chinese Application No. 2013105461902 dated May 12, 2015, pp. 1-2.
Office Action in commonly owned Korean Application No. 10-2012-0143947 dated Apr. 13, 2015, pp. 1-6.
International Search Report in commonly owned International Application No. PCT/KR2013/000729 dated Jul. 4, 2013, pp. 1-4.
Non-Final Office Action in commonly owned U.S. Appl. No. 14/044,941 mailed Sep. 25, 2014, pp. 1-8.
Final Office Action in commonly owned U.S. Appl. No. 14/044,941 mailed Feb. 9, 2015, pp. 1-7.
Advisory Action in commonly owned U.S. Appl. No. 14/044,941 mailed Apr. 14, 2015, pp. 1-6.

(Continued)

*Primary Examiner* — Mark Kaucher
(74) *Attorney, Agent, or Firm* — Additon, Higgins & Pendleton, P.A.

(57) ABSTRACT

The polycarbonate resin composition of the present invention comprises: a polycarbonate ingredient including a copolymerized polycarbonate resin and an aromatic polycarbonate resin, the copolymerized polycarbonate resin having a repeating unit represented by chemical formula 1 of claim 1, a repeating unit represented by chemical formula 2 of claim 1, and a repeating unit represented by chemical formula 3 of claim 1; and an acrylic-based impact reinforcing agent. The polycarbonate resin composition has excellent scratch resistance, impact resistance, and heat resistance.

12 Claims, No Drawings

(56) References Cited

OTHER PUBLICATIONS

Non-Final Office Action in commonly U.S. Appl. No. 4/044,941 mailed Jul. 27, 2015, pp. 1-6.
Notice of Allowance in commonly owned U.S. Appl. No. 14/044,941 mailed Nov. 6, 2015, pp. 1-5.
Non-Final Office Action in commonly owned U.S. Appl. No. 14/647,640 mailed Dec. 14, 2015, pp. 1-10.

* cited by examiner

POLYCARBONATE RESIN COMPOSITION AND MOLDED PRODUCT FORMED FROM SAME

CROSS-REFERENCE TO RELATED APPLICATIONS

This application claims priority to and the benefit of International Application No. PCT/KR2013/002697, filed Apr. 2, 2013, which published as WO 2014/104484 on Jul. 3, 2014, and Korean Patent Application No. 10-2012-0155613, filed in the Korean Intellectual Property Office on Dec. 27, 2012, the entire disclosure of each of which is incorporated herein by reference.

TECHNICAL FIELD

The present invention relates to a polycarbonate resin composition and a molded article formed from the same. More particularly, the present invention relates to a polycarbonate resin composition having excellent properties in terms of scratch resistance, impact resistance, and heat resistance and a molded article formed from the same.

BACKGROUND ART

Recently, as an exterior material for electric/electronic products, office products, and the like, thermoplastic resins having lower specific gravity than glass or metal and excellent formability are widely used. Thus, in the field of thermoplastic resins, functions and appearances as exterior materials are growing in importance, and importance of impact resistance and scratch resistance is strengthened, which represent characteristics capable of withstanding external shock or scratch. Moreover, with the development of high-grade electric/electronic products, aesthetics of the products is increasingly important, which leads to increased interest in transparent thermoplastic resins having excellent scratch resistance.

Polycarbonate resins are a representative thermoplastic resin that have a heat deflection temperature of 135° C. or higher, and exhibit excellent properties in terms of transparency, impact resistance, self-extinguishing properties, dimensional stability and heat resistance, and are widely used in various applications, such as exterior materials of electronic and electric products, office equipment, automobile components, and the like.

However, polycarbonate resins and resin compositions have a limitation in use as exterior materials or optical films for laptops, mobile phones, and the like due to poor scratch resistance. A polycarbonate film can be coated with a scratch-resistant film in order to improve scratch resistance of polycarbonate resins. In this case, an expensive scratch-resistant film and an additional coating process can cause an increase in manufacturing costs.

Therefore, besides such a film coating technique, various studies on various methods have been made to improve scratch resistance of polycarbonate resins and resin compositions. Thereamong, blending polycarbonate resins with a scratch-resistant resin such as acrylic resins is most commonly used.

However, when polycarbonate resins are blended with acrylic resins to improve scratch resistance, impact resistance and heat resistance of the polycarbonate resins can be drastically reduced, and compatibility between the blended resins can considerably increase haze, thereby damaging transparency, which is one of the advantages of the polycarbonate resins.

Therefore, there is a need for a polycarbonate resin composition having excellent scratch resistance without deterioration in inherent physical properties, such as impact resistance, heat resistance, and transparency.

DISCLOSURE

Technical Problem

It is an aspect of the present invention to provide a polycarbonate resin composition having excellent scratch resistance, impact resistance, and heat resistance, and a molded article formed from the same.

The above and other aspects of the present invention can be achieved by the present invention described below.

Technical Solution

One aspect of the present invention relates to a polycarbonate resin composition. The polycarbonate resin composition includes: a polycarbonate component including a copolymerized polycarbonate resin containing a repeat unit represented by Formula 1, a repeat unit represented by Formula 2, and a repeat unit represented by Formula 3, and an aromatic polycarbonate resin; and an acrylic impact modifier.

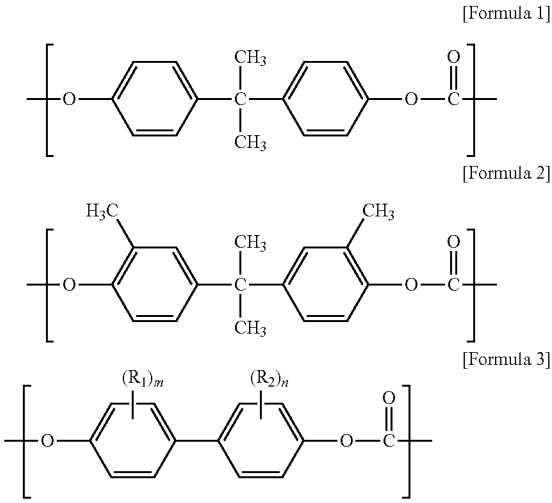

where $R_1$ and $R_2$ are each independently a substituted or unsubstituted $C_1$ to $C_6$ alkyl group, and m and n are each independently an integer from 0 to 4.

In one embodiment, in the polycarbonate component, the copolymerized polycarbonate resin may be present in an amount of about 1% by weight (wt %) to about 99 wt % in the polycarbonate component, and the aromatic polycarbonate resin may be present in an amount of about 1 wt % to about 99 wt %.

In one embodiment, in the copolymerized polycarbonate resin, the repeat unit represented by Formula 1 may be present in an amount of about 1 mol % to about 69 mol %, the repeat unit represented by Formula 2 may be present in an amount of about 30 mol % to about 98 mol %, and the repeat unit represented by Formula 3 may be present in an amount of about 1 mol % to about 50 mol %.

In one embodiment, the acrylic impact modifier may be a graft copolymer in which at least one monomer selected from among methyl (meth)acrylate, ethyl (meth)acrylate, propyl (meth)acrylate, butyl (meth)acrylate, styrene, α-methyl styrene, alkyl-substituted styrene, acrylonitrile, methacrylonitrile, maleic anhydride, and alkyl- or phenyl-N-substituted maleimide is grafted to a rubbery polymer including at least one of a $C_4$ to $C_6$ diene rubber and an acrylate rubber obtained by polymerizing at least one $C_4$ to $C_{20}$ alkyl(meth)acrylate.

In one embodiment, the acrylic impact modifier may be present in an amount of about 1 part by weight to about 30 parts by weight based on 100 parts by weight of the polycarbonate component.

In one embodiment, the polycarbonate resin composition may have a scratch width of 312 μm or less, as measured by a ball-type scratch profile (BSP) test and have a pencil hardness of HB or higher.

In one embodiment, the polycarbonate resin composition may have an Izod impact strength of about 12 kg·cm/cm to about 90 kg·cm/cm.

In one embodiment, the polycarbonate resin composition may have a Vicat softening temperature (VST) of about 110° C. to about 150° C.

Another aspect of the present invention relates to a molded article formed from the polycarbonate resin composition as set forth above.

Advantageous Effects

The present invention provides a polycarbonate resin composition having excellent scratch resistance, impact resistance, and heat resistance, and a molded article formed from the same. The polycarbonate resin composition is useful for exterior materials of electronic/electric products, office machines, and the like.

Best Mode

Hereinafter, embodiments of the present invention will be described in detail as follows.

A polycarbonate resin composition according to the present invention may include: a polycarbonate component including a copolymerized polycarbonate resin and aromatic polycarbonate resin; and an acrylic impact modifier.

(A) Polycarbonate Component (A1) Copolymerized Polycarbonate Resin

The copolymerized polycarbonate resin is a terpolymer containing a repeat unit represented by Formula 1, a repeat unit represented by Formula 2, and a repeat unit represented by Formula 3.

[Formula 1]

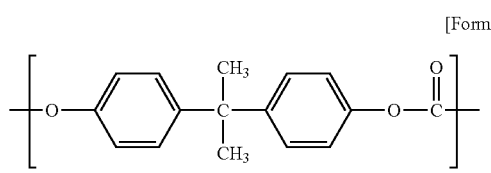

[Formula 2]

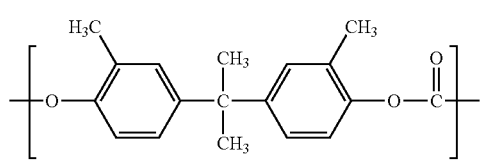

[Formula 3]

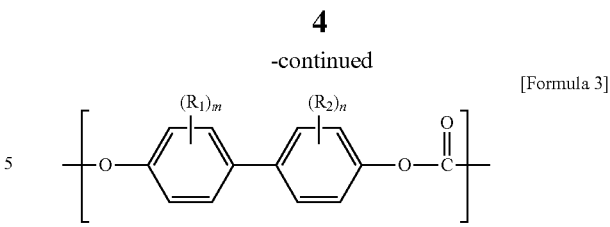

Where $R_1$ and $R_2$ are each independently a substituted or unsubstituted $C_1$ to $C_6$ alkyl group, and m and n are each independently an integer from 0 to 4.

As used herein, the term "substituted" means that a hydrogen atom is substituted with a halogen group, a $C_1$ to $C_{10}$ alkyl group, a $C_1$ to $C_{10}$ haloalkyl group, a $C_6$ to $C_{10}$ aryl group, a $C_1$ to $C_{10}$ alkoxy group, and combination thereof In one embodiment, in the copolymerized polycarbonate resin, the repeat unit represented by Formula 1 may be present in an amount of about 1 mol % to about 69 mol %, preferably about 2 mol % to about 59 mol %; the repeat unit represented by Formula 2 may be present in an amount of about 30 mol % to about 98 mol %, preferably about 40 mol % to about 96 mol %; and the repeat unit represented by Formula 3 may be present in an amount of about 1 mol % to about 50 mol %, preferably about 1 mol % to about 30 mol %. Within this range, the polycarbonate resin composition can exhibit excellent properties in terms of scratch resistance, impact resistance, heat resistance, and balance therebetween.

The copolymerized polycarbonate resin may have a weight average molecular weight (Mw) of about 16,000 g/mol to about 100,000 g/mol, preferably about 16,500 g/mol to about 75,000 g/mol, as measured by gel permeation chromatography (GPC). Within this range, the composition can have excellent scratch resistance.

The copolymerized polycarbonate resin according to the present invention may be prepared by any general method of preparing a polycarbonate resin, for example, by condensation or transesterification of a carbonate precursor with a diol mixture containing bisphenol A (BPA) represented by Formula 4, 3,3'-dimethylbisphenol A (DMBPA) represented by Formula 5, and a biphenol compound represented by Formula 6.

[Formula 4]

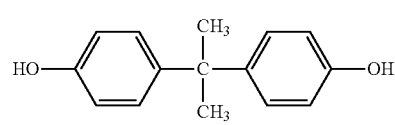

[Formula 5]

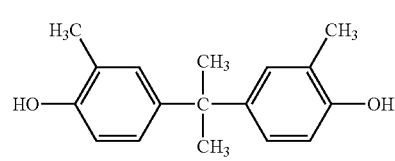

[Formula 6]

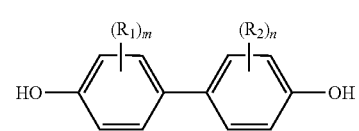

where $R_1$, $R_2$, m, and n are the same as defined in Formula 3.

Examples of the biphenol compound represented by Formula 6 may include 4,4'-biphenol, 2,2'-dimethyl 4,4'-biphenyldiol, 3,3-dimethyl 4,4-dihydroxy biphenyl, and 2,2',6,6'-tetramethyl-4,4'-biphenol, without being limited thereto. Preferably, 4,4'-biphenol is used.

In the diol mixture, the bisphenol A (BPA) may be present in an amount of about 1 mol % to about 69 mol %, preferably about 2 mol % to about 59 mol %; the 3,3'-dimethylbisphenol A (DMBPA) may be present in an amount of about 30 mol % to about 98 mol %, preferably about 40 mol % to about 96 mol %; and the biphenol compound represented by Formula 6 may be present in an amount of about 1 mol % to about 50 mol %, preferably about 1 mol % to about 30 mol %. Within this range, the polycarbonate resin composition can exhibit excellent properties in terms of scratch resistance, impact resistance, heat resistance, and balance therebetween.

Examples of the carbonate precursor may include phosgene, triphosgene, diaryl carbonate, and mixtures thereof. Further examples of diaryl carbonate may include diphenyl carbonate, ditolyl carbonate, bis(chlorophenyl) carbonate, m-cresyl carbonate, dinaphthyl carbonate, and bis(diphenyl) carbonate, without being limited thereto. These may be used alone or in combination thereof. Preferably, diphenyl carbonate is used.

A molar ratio (diol mixture/carbonate precursor) of the diol mixture to the carbonate precursor ranges, for example, from about 0.5 to about 2.0, preferably from about 0.7 to about 1.5. Within this range of the molar ratio, the polycarbonate resin can exhibit excellent mechanical strength.

In one embodiment, the reaction of the diol mixture and the polycarbonate precursor may be transesterification, which is performed at about 150° C. to about 360° C., preferably about 160° C. to about 330° C., more preferably about 170° C. to about 320° C. under reduced pressure. Within this temperature range, the reaction is advantageously performed in view of reaction speed and decrease in side reaction.

Further, transesterification is advantageously performed, in view of reaction speed and decrease in side reaction, under a reduced pressure of about 750 torr or less, for example, about 600 torr or less, preferably about 300 torr or less, more preferably about 100 torr or less, for at least 10 minutes or more, preferably about 15 minutes to about 24 hours, more preferably about 15 minutes to about 12 hours.

Transesterification may be performed in the presence of a catalyst. Any typical catalyst used in transesterification may be employed as the catalyst, examples of which may include alkali metal catalysts, alkaline earth metal catalysts, and the like. Examples of the alkali metal catalysts may include LiOH, NaOH, and KOH, without being limited thereto. These catalysts may be used alone or in combination thereof. The catalyst is present in an amount of, for example, about $1 \times 10^{-8}$ to about $1 \times 10^{-3}$ moles, preferably about $1 \times 10^{-7}$ to about $1 \times 10^{-4}$ moles per mole of the diol mixture. Within this range, the polycarbonate resin composition can exhibit sufficient reactivity while minimizing production of byproducts by side reaction, thereby improving thermal stability and color stability.

(A2) Aromatic Polycarbonate Resin

As the aromatic polycarbonate resin, any typical aromatic polycarbonate resin used in thermoplastic resin compositions may be used without limitation. For example, the aromatic polycarbonate resin may be an aromatic polycarbonate resin prepared by condensation or transesterification of a carbonate precursor such as phosgene and diaryl carbonate with a dihydric phenol compound in the presence of a molecular weight regulator and a catalyst according to a typical method of preparing an aromatic polycarbonate resin.

In this method of preparing an aromatic polycarbonate resin, as the dihydric phenol compound, a bisphenol compound, preferably 2,2-bis(4-hydroxyphenyl)propane ("bisphenol A") may be used. Here, the bisphenol A may be partially or completely replaced by different dihydric phenol compounds. Examples of other applicable dihydric phenol compounds may include hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, 2,2-bis(3,5-dibromo-4-hydroxyphenyl)propane, and other halogenated bisphenols.

However, the dihydric phenol compounds applicable to preparation of the aromatic polycarbonate resin are not limited thereto, and the aromatic polycarbonate resin may be prepared using any typical dihydric phenol compound.

Further, the aromatic polycarbonate resin may be a homopolymer using one dihydric phenol compound, a copolymer using two or more dihydric phenol compounds, or a mixture thereof. However, it should be understood that, when the aromatic polycarbonate resin is the aforementioned copolymer, this copolymeric aromatic polycarbonate resin is different from the copolymerized polycarbonate resin (A1).

Typically, the aromatic polycarbonate resin may take the form of a linear polycarbonate resin, a branched polycarbonate resin, or a polyester-carbonate copolymer resin. The aromatic polycarbonate resin included in the polycarbonate resin composition according to the invention is not limited to a specific form, and may be any one of a linear polycarbonate resin, a branched polycarbonate resin, and a polyester-carbonate copolymer resin.

The linear polycarbonate resin may be, for example, a bisphenol A polycarbonate resin, and the branched polycarbonate resin may be prepared, for example, by reaction of a multifunctional aromatic compound such as trimellitic anhydride or trimellitic acid with a dihydric phenol compound and a carbonate precursor. Further, the polyester-carbonate copolymer resin may be prepared, for example, by reaction of bifunctional carboxylic acid with a dihydric phenol compound and a carbonate precursor. In addition, as the aromatic polycarbonate resin, typical linear polycarbonate resins, branched polycarbonate resins, or polyester-carbonate copolymer resins may be used without limitation.

The aromatic polycarbonate resin may have a weight average molecular weight (Mw) of about 13,000 g/mol to about 100,000 g/mol, preferably about 16,000 g/mol to about 50,000 g/mol, as measured by gel permeation chromatography (GPC). Within this range, the polycarbonate resin composition can exhibit excellent mechanical properties.

In one embodiment, in the polycarbonate component, the copolymerized polycarbonate resin (A1) may be present in an amount of about 1 wt % to about 99 wt %, preferably about 1 wt % to about 90 wt %, and the aromatic polycarbonate resin (A2) may be present in an amount of about 1 wt % to about 99 wt %, preferably about 1 wt % to about 90 wt %. Within this range, the polycarbonate resin composition can exhibit excellent properties in terms of scratch resistance, impact resistance, heat resistance, and balance therebetween.

(B) Acrylic Impact Modifier

The acrylic impact modifier may include any typical acrylic impact modifier used in the art, and may be, for example, a multilayered graft copolymer in which at least one monomer selected from among methyl (meth)acrylate, ethyl (meth)acrylate, propyl (meth)acrylate, butyl (meth)acrylate, styrene, a-methyl styrene, $C_1$ to $C_{30}$ alkyl-substituted styrene, acrylonitrile, methacrylonitrile, maleic anhydride, and ($C_1$ to $C_{30}$) alkyl- or phenyl-N-substituted maleimide is grafted to a rubbery polymer including at least one of a $C_4$ to $C_6$ diene rubber and an acrylate rubber obtained by polymerizing at least one $C_4$ to $C_{20}$ alkyl (meth)acrylate, for example, at least one of ethyl (meth)acrylate, butyl (meth)acrylate, hexyl (meth)acrylate, ethylhexyl (meth)acrylate, stearyl (meth)acrylate, and lauryl (meth)acrylate. The acrylic impact modifier may have an average particle diameter of about 0.05 μm to about 0.5 μm, specifically about 0.1 μm to about 0.4 μm. Within this range, the acrylic impact modifier can provide excellent impact resistance. Here, in the acrylic impact modifier, the rubbery polymer may be present in an amount of about 10 wt % to about 80 wt %, without being limited thereto.

The acrylic impact modifier may be present in amount of about 1 part by weight to about 30 parts by weight, preferably about 1 part by weight to about 20 parts by weight based on 100 parts by weight of the polycarbonate component. Within this range, the polycarbonate resin composition can exhibit excellent impact resistance without deterioration in other properties.

The polycarbonate resin composition according to the present invention may further include additives such as flame retardants, flame retardant supplements, lubricants, surfactants, nucleating agents, coupling agents, fillers, plasticizers, antibacterial agents, release agents, heat stabilizers, antioxidants, photostabilizers, compatibilizers, inorganic additives, antistatic agents, pigments, and dyes, as needed.

These additives may be used alone or in combination thereof. Although the additives may be added to the resin composition during a typical pelletization process (extrusion), an addition method of the additives is not limited thereto. The additives may be present in amount of about 0.001 parts by weight to about 30 parts by weight based on 100 parts by weight of the polycarbonate component, without being limited thereto.

The polycarbonate resin composition according to the present invention exhibits better scratch resistance, impact resistance, heat resistance, and balance therebetween than a polycarbonate resin composition which includes an acrylic resin component rather than the polycarbonate component, and has a scratch width of about 312 μm or less, preferably about 200 μm to about 312 as measured by a ball-type scratch profile (BSP) test; a pencil hardness of HB or higher, preferably F to 3H, under a load of 500 g in accordance with ASTM D3362; and an Izod impact strength of about 12 kgf·cm/cm to about 90 kgf·cm/cm, preferably about 12 kgf·cm/cm to about 60 kgf·cm/cm, as measured on an about 1/8" thick specimen in accordance with ASTM D256. Further, the polycarbonate resin composition has a Vicat softening temperature (VST) of about 110° C. to about 150° C., preferably about 120° C. to about 140° C., as measured in accordance with ASTM D1525.

Another aspect of the present invention relates to a molded article formed from the polycarbonate resin composition as set forth above.

The polycarbonate resin composition according to the present invention may be prepared in the form of pellets by a method in which the above components and, optionally, other additives are mixed at the same time, followed by melt extrusion in an extruder. The prepared pellets may be produced into various molded articles (products) through various molding methods, such as injection molding, extrusion, vacuum molding, casting, and the like. Such molding methods are well known to those skilled in the art. The molded article exhibits excellent properties in terms of impact resistance, heat resistance, scratch resistance, and the like, and can thus be widely used for components of electric/electronic products, exterior materials, automotive components, general goods, construction materials, and the like.

MODE FOR INVENTION

Hereinafter, the present invention will be described in more detail with reference to examples. It should be understood that these examples are provided for illustration only and are not to be construed in any way as limiting the present invention.

EXAMPLES

Details of components used in the following Examples and Comparative Examples are as follows:

(A) Polycarbonate Component (A1) Copolymerized Polycarbonate Resin

A copolymerized polycarbonate resin prepared by the following method was used.

0.3 kg of 2,2-bis(4-hydroxyphenyl)propane (BPA), 2.70 kg of 3,3'-dimethyl bisphenol A (DMBPA), 0.28 kg of 4,4-biphenol, 2.92 kg of diphenyl carbonate, and 200 ppb of KOH (based on 1 mole of BPA) were sequentially added to a reactor, and oxygen was removed from the reactor by purging with nitrogen. The reactor was heated to and maintained at 160° C. and then heated again to 190° C., at which reaction was performed for 6 hours. Then, the reactor was heated again to 210° C. and maintained at a pressure of 100 torr for 1 hour. Next, the reactor was heated to 260° C. and maintained at a pressure of 20 torr for 1 hour, after which the pressure of the reactor was reduced to and maintained at 0.5 torr for 1 hour, thereby preparing a molten copolymerized polycarbonate resin. The prepared copolymerized polycarbonate resin was produced into pellets form using a pelletizer (weight average molecular weight: 30,000 g/mol).

(A2) Aromatic Polycarbonate Resin

A bisphenol-A type polycarbonate resin (L-1250WP, TEUIN Chemicals, weight average molecular weight: 25,000 g/mol) was used.

(B) Impact Modifier (B1) Acrylic Impact Modifier

A methyl methacrylate-butadiene-ethyl acrylate graft copolymer (EXL 2602 Grade, KUREHA CHEM Ind. Co., Ltd, mole ratio: 20:60:20) was used.

(B2) Rubber-Modified Vinyl Graft Copolymer

A core-shell type graft ABS copolymer having a rubber particle diameter of about 0.25 nm obtained by graft emulsion polymerization of a monomer mixture of 10.5 parts by weight of acrylonitrile and 31.5 parts by weight of styrene with 58 parts by weight of butadiene rubber was used.

(C) Methacrylic Resin

A polymethyl methacrylate (PMMA) resin (L84, LG MMA Corporation, weight average molecular weight: 92,000 g/mol) was used.

Examples 1 to 6 and Comparative Examples 1 to 7

The above components were added in amounts as listed in Table 1, followed by melting, kneading and extrusion, thereby preparing pellets. Here, extrusion was performed using a twin-screw extruder (L/D=35) having a diameter of 45 mm, and the prepared pellets were dried at 120° C. for 4 hours, followed by injection molding using an injection machine (DHC-180MC, DONG SHIN HYDRAULIES Co., Ltd., molding temperature: 290° C., mold temperature: 60° C.).

TABLE 1

|  | Example | | | | | | Comparative Example | | | | | | |
| --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 |
| (A1) (wt %) | 10 | 30 | 10 | 30 | 50 | 80 | — | — | — | — | 10 | 30 | 80 |
| (A2) (wt %) | 85 | 65 | 80 | 60 | 40 | 10 | 80 | 60 | 40 | 10 | 80 | 60 | 10 |
| (B1) (wt %) | 5 | 5 | 10 | 10 | 10 | 10 | 10 | 10 | 10 | 10 | — | — | — |
| (B2) (wt %) | — | — | — | — | — | — | — | — | — | — | 10 | 10 | 10 |
| (C) (wt %) | — | — | — | — | — | — | 10 | 30 | 50 | 80 | — | — | — |
| BSP (width, μm) | 298 | 273 | 306 | 282 | 250 | 241 | 306 | 284 | 260 | 250 | 330 | 312 | 286 |
| Pencil hardness | HB | F | HB | F | H | H | HB | F | F | H | B | B | HB |
| Heat resistance (VST, ° C.) | 137 | 131 | 133 | 128 | 122 | 117 | 109 | 105 | 101 | 98 | 124 | 119 | 105 |
| Izod impact resistance (kgf · cm/cm) | 22.9 | 14.2 | 30.9 | 19.4 | 15.9 | 12.1 | 15.6 | 9.3 | 4.1 | 2.5 | 28.5 | 16.4 | 10.1 |

Property Evaluation (1) BSP (Ball-type Scratch Profile): A 10 to 20 mm-long scratch was made on the surface of a 90 mm long×50 mm wide×2.5 mm thick specimen under a load of 1,000 g at a scratching speed of 75 mm/min using a spherical metal tip having a diameter of 0.7 mm. The profile of the scratch was subjected to surface scanning by a metal stylus tip having a diameter of 2 nm using a contact surface profiler (XP-1) manufactured by Ambios Technology Inc., thereby evaluating scratch width (unit: nm) as a measure of scratch resistance. Here, a shorter scratch width indicates a higher scratch resistance value.

(2) Pencil hardness: Pencil hardness was measured under a load of 500 g according to ASTM D3362.

(3) Heat resistance (VST, unit: ° C.): Heat resistance was measured under a load of 5 kgf using a Vicat softening temperature (VST) measuring instrument (6A-2, Toyoseiki Co.,Ltd.) in accordance with ASTM D1525.

(4) Izod impact strength (unit: kgf·cm/cm): Izod impact strength was measured on 1/8" thick notched Izod specimens in accordance with ASTM D256.

As can be seen from the results shown in Table 1, the polycarbonate resin compositions (Examples 1 to 5) according to the present invention exhibited excellent properties in terms of impact resistance, heat resistance, scratch resistance, and balance therebetween. On the contrary, the polycarbonate resin compositions prepared in Comparative Examples 1 to 4 suffered from deterioration in scratch resistance or had considerably low impact resistance and heat resistance, and exhibited unsatisfactory balance between physical properties. In addition, the polycarbonate resin compositions prepared in Comparative Examples 5 to 7 using the graft ABS copolymer had significantly reduced scratch resistance or exhibited low impact resistance and heat resistance.

It should be understood that various modifications, changes, alterations, and equivalent embodiments can be made by those skilled in the art without departing from the spirit and scope of the invention.

The invention claimed is:

1. A polycarbonate resin composition comprising:
a polycarbonate component comprising about 1 wt % to about 90 wt % of a copolymerized polycarbonate resin containing a repeat unit represented by Formula 1, a repeat unit represented by Formula 2, and a repeat unit represented by Formula 3, and about 1 wt % to about 90 wt % of an aromatic polycarbonate resin consisting of units derived from the condensation or transesterification of a carbonate precursor with a dihydric phenol compound; and
an acrylic impact modifier, wherein the acrylic impact modifier is a graft copolymer in which methyl methacrylate is grafted to a rubbery polymer including at least one of a $C_4$ to $C_6$ diene rubber and an acrylate rubber obtained by polymerizing at least one $C_4$ to $C_{20}$ alkyl (meth)acrylate:

[Formula 1]

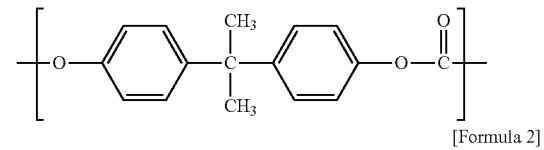

[Formula 2]

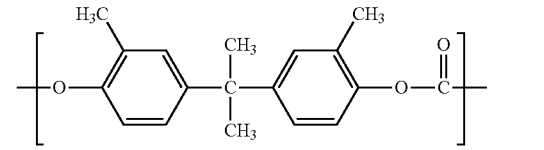

[Formula 3]

where $R_1$ and $R_2$ are each independently a substituted or unsubstituted $C_1$ to $C_6$ alkyl group, and m and n are each independently an integer from 0 to 4.

2. The polycarbonate resin composition according to claim 1, wherein, in the copolymerized polycarbonate resin, the repeat unit represented by Formula 1 is present in an amount of about 1 mol % to about 69 mol %, the repeat unit represented by Formula 2 is present in an amount of about 30 mol % to about 98 mol %, and the repeat unit represented by Formula 3 is present in an amount of about 1 mol % to about 50 mol %.

3. The polycarbonate resin composition according to claim 1, comprising the acrylic impact modifier in an amount of about 1 part by weight to about 30 parts by weight based on 100 parts by weight of the polycarbonate component.

4. The polycarbonate resin composition according to claim 1, wherein the polycarbonate resin composition has a scratch width of 312 μm or less, as measured by a ball-type scratch profile (BSP) test, and has a pencil hardness of HB or higher.

5. The polycarbonate resin composition according to claim 1, wherein the polycarbonate resin composition has an Izod impact strength of about 12 kgf·cm/cm to about 90 kgf·cm/cm measured on a 1/8" thick notched Izod specimen in accordance with ASTM D256.

6. The polycarbonate resin composition according to claim 1, wherein the polycarbonate resin composition has a Vicat softening temperature (VST) of about 110° C. to about 150° C.

7. A molded article formed from the polycarbonate resin composition according to claim 1.

8. The polycarbonate resin composition according to claim 1, wherein the polycarbonate resin composition has a scratch width of 200 μm to 306 μm, as measured by a ball-type scratch profile (BSP) test.

9. The polycarbonate resin composition according to claim 1, wherein the acrylic impact modifier is a methyl methacrylate-butadiene-ethyl acrylate graft copolymer.

10. The polycarbonate resin composition according to claim 1, wherein the acrylic impact modifier is a graft copolymer in which methyl methacrylate is grafted to a rubbery polymer including an acrylate rubber.

11. The polycarbonate resin composition according to claim 1, comprising 10 wt % to 80 wt % of the copolymerized polycarbonate resin and 10 wt % to 85 wt % of the aromatic polycarbonate resin.

12. The polycarbonate resin composition according to claim 11, wherein the polycarbonate resin composition has an Izod impact strength of about 12 kgf·cm/cm to about 60 kgf·cm/cm measured on a 1/8" thick notched Izod specimen in accordance with ASTM D25610 and a scratch width of about 200 μm to 306 μm, as measured by a ball-type scratch profile (BSP) test.

* * * * *

UNITED STATES PATENT AND TRADEMARK OFFICE
CERTIFICATE OF CORRECTION

PATENT NO. : 9,783,672 B2
APPLICATION NO. : 14/652160
DATED : October 10, 2017
INVENTOR(S) : Dong Geun Lee et al.

It is certified that error appears in the above-identified patent and that said Letters Patent is hereby corrected as shown below:

In the Specification

Column 7, delete Line 51 and insert: --about 200 µm to about 312 µm, as measured by a ball-type--

Column 8, delete Line 46 and insert: --TEIJIN Chemicals, weight average molecular weight:--

Column 9, delete Line 33 and insert: --diameter of 2 µm using a contact surface profiler (XP-1)--

Column 9, delete Line 35 and insert: --ing scratch width (unit: µm) as a measure of scratch resis- --

Signed and Sealed this
Twenty-fourth Day of April, 2018

Andrei Iancu
*Director of the United States Patent and Trademark Office*